United States Patent [19]

Boateng

[11] Patent Number: 5,110,432
[45] Date of Patent: May 5, 1992

[54] METHOD FOR SEPARATING DISSOLVED SPECIES BY ELECTRODIALYSIS

[75] Inventor: Daniel A. D. Boateng, Montrose, Canada

[73] Assignee: Cominco Ltd., Trail, Canada

[21] Appl. No.: 602,903

[22] Filed: Oct. 25, 1990

Related U.S. Application Data

[63] Continuation of Ser. No. 338,825, Apr. 17, 1989, abandoned.

[51] Int. Cl.$^5$ .................................................. B01D 13/02
[52] U.S. Cl. .............................. 204/182.3; 204/182.4; 204/301
[58] Field of Search ................... 204/182.4, 182.3, 301

[56] References Cited

U.S. PATENT DOCUMENTS

| | | | |
|---|---|---|---|
| 4,298,442 | 11/1981 | Giuffrida | 204/301 |
| 4,324,629 | 4/1982 | Oka et al. | 204/182.4 |
| 4,636,288 | 1/1987 | Vaughan | 204/182.4 |
| 4,671,861 | 6/1987 | Krulik | 204/182.4 |
| 4,675,090 | 6/1987 | Dagard et al. | 204/182.4 |
| 4,715,939 | 12/1987 | Ball et al. | 204/182.4 |

OTHER PUBLICATIONS

Marcel Pourbaix, Atlas of Electrochemical Equilibrium in Aqueous Solutions, (1966) 165, 166, 454 etc.

Primary Examiner—John Niebling
Assistant Examiner—Arun S. Phasge
Attorney, Agent, or Firm—Arne I. Fors

[57] ABSTRACT

Electrodialysis is used to separate at least one species of a first group of elements present in ionized form from at least one species of a second group of elements present in nonionized form in water-containing solutions, provided that the pH of the solutions and the oxidation state of species of the second group have the appropriate values. If necessary, either the pH, the oxidation state or both are adjusted in the solution fed to the electrodialysis unit such that species of the first group are present in ionized form and species of the second group are present in a nonionized form. The method is applicable to a large number of solutions from metallurgical and chemical processes. Species of the first group include at least one element of groups IA, except Fr, IB, IIA, IIB, IIIA except B, IIIB, IVB, VIIB and VIII except Os of the periodic table; the elements V, Cr, Sn, Pb and Bi; and acids of N, S, F, Cl, Br and I. Species of the second group comprise acids containing at least one element including B, C, Si, Ge, P, As, Sb, Se, Te and F. Electrodialysis is carried out in one of more stages at 10–500 A/m$^2$ and 0°–60° C. while minimizing water splitting, and using alternating cationic and anionic permselective membranes forming alternating concentrate and diluate cells between an anode and a cathode. The ionized species migrate through the membranes from the diluate to the concentrate cells and the nonionized species remain in the diluate cells. Solution concentrated in ionic species is withdrawn from the concentrate cells, and solution containing the nonionized species is withdrawn from the diluate cells. The electrode compartments are rinsed with appropriate rinse solutions.

9 Claims, No Drawings

METHOD FOR SEPARATING DISSOLVED SPECIES BY ELECTRODIALYSIS

This application is a continuation-in-part of application Ser. No. 338,825, filed Apr. 17, 1989, now abandoned.

This invention relates to a method for the separation of dissolved species by electrodialysis and, more particularly, to a method for the separation by electrodialysis of ionized from nonionized species in aqueous systems.

BACKGROUND

In the treatment of solutions that contain one or more elements in cationic, anionic or radical form dissolved therein, a separation of one or more ions or radicals can be accomplished by using electrodialysis. In electrodialysis, a feed solution is circulated through an electrodialyzer cell that comprises an anode and a cathode positioned in an anode and a cathode compartment, separated from each other by a multiplicity of alternating anionic and cationic selective exchange membranes. The alternating membranes and associated gaskets in appropriate arrangement form alternating concentrate and diluate cells. A direct current is applied between the electrodes and solution is fed to the diluate cells. A concentrate enriched in the ions that have passed through the membranes is withdrawn from the concentrate cells.

Electrodialysis has been used in a multitude of applications which include the separation of cations, anions, monovalent from multivalent ions, ionic species of the same or different electrical charge, acids from elements in ionic form, amphoteric elements, compounds of different conductances and degree of dissociation in solution, and ionic species from nondissociated organic compounds.

The removal of ionized species by electrodialysis is well documented but few references deal with the separation of ionized species from nonionized species. According to U.S. Pat. No. 2,854,393, electrodialysis is used for the fractionation of cations, anions, organic and inorganic ions, the separation of nonionic and nondissociated compounds in solution, as well as the separation of different compounds of different conductances and different degrees of dissociation in solution. Examples of separations of nonionic compounds all relate to organic compounds. Separation of compounds of different degrees of dissociation are only mentioned in passing, and relate to aqueous solutions of sodium chloride, boric acid, sodium acetate and acetic acid. All these fractionations and separations are carried out, however, with the application of a mechanical or gravitational accelerating force resulting in the formation of separate fluid strata in the cell from which solutions are withdrawn that contain an increased concentration of one of the species to be separated.

The separation of chloride ions and impurities from boric acid by electrodialysis has been discussed by Russian authors (Chem. Abs., vol. 60, 11404b and vol. 78, 140772p). The separation of calcium ions from phosphoric acid by electrodialysis is disclosed in Belgian Patent 643 464. Japanese unexamined application 79 132 496 discloses electrodialysis of an aqueous sodium silicate solution at pH 1–3 and containing 3–25% $SiO_2$ together with 0.5N sodium chloride solution. Sodium ions and sulfuric acid were removed from a silica sol.

It appears from these references that separations of ionized from nonionized species by electrodialysis has only been carried out with a very limited number of elements

SUMMARY OF THE INVENTION

We have now found that a very large number of elements in ionized form can be separated by electrodialysis from a number of elements that can be present in aqueous systems in nonionized form. More particularly, we have found that a separation by electrodialysis can be effected between at least one element of a first group of elements that is present in ionized form in solution and at least one element of a second group of elements that is present in nonionized form, provided that the pH of the solution and the oxidation state of elements of the second group have the appropriate values. If necessary, either the pH or the oxidation state or both are adjusted such that the separation can be effected. The electrodialysis for the separation of ionized from nonionized species is carried out along conventional lines in an electrodialyzer cell wherein a cathode compartment containing a suitable cathode and an anode compartment containing a suitable anode are separated from each other by a plurality of alternating suitable cation permselective and suitable anion permselective exchange membranes which form alternating concentrate and diluate cells. Generally, an anionic membrane is arranged next to the anode compartment and a cationic membrane next to the cathode. In certain embodiments a cationic membrane is next to the anode compartment and an anionic membrane is next to the cathode compartment, or anionic membranes are next to both compartments in case solutions contain metal ions that can be cathodically deposited.

A feed solution containing dissolved species is fed into the diluate cells of an electrodialysis unit. If necessary, the feed solution is adjusted to a predetermined value of the pH or the oxidation state of the element desired to be present in nonionized form or predetermined values of both the pH and the oxidation state, such that at least one species of a first group of elements of the periodic table of elements is present in the solution in ionized form and at least one species of a second group of species containing elements of the periodic table of elements is present in the solution in nonionized form. The feed solution is a water-containing solution that may also contain organic components. A suitable direct current is applied between the electrodes in the electrode compartments of the unit, and the value of the current is sufficient to effect the separation while substantially preventing water splitting. The ionized species migrate through the membranes from the solution in the diluate cells into solution in the concentrate cells. The nonionized species substantially remain in the diluate cells. During electrodialysis, the circulating solution in the concentrate cells becomes concentrated in the ionized species, and the circulating solution in the diluate cells becomes depleted in the ionized species. A solution is withdrawn from the concentrate cells that is concentrated in ionized species and a solution is withdrawn from the diluate cells that is depleted in ionized species. Electrodialysis is carried out under turbulent conditions in the cells, at up to 60° C., a differential membrane pressure of less than 150 kPa and a current density in the range of 10 to 500 A/m². The electrode compartments are preferably rinsed with appropriate, circulating rinse solutions, or a common rinse solution.

The electrodialysis may be carried out in single or multi-stage to effect the desired degree of separation and concentration. The method of the invention is particularly useful in the treatment or purification of metallurgical and chemical process solutions, waste solutions, waste water and the like.

It is a principal object of the present invention to provide a method for the separation of dissolved species by electrodialysis. It is another object to provide a method for the separation by electrodialysis of ionized species from nonionized species in water-containing systems. It is yet another object to provide a method for the electrodialytic separation of species in a solution adjusted in the value of the pH or the value of the oxidation state or both. These and other objects of the invention will become clear from the following detailed description of the embodiments of the method according to the invention.

According to the main embodiment of the invention, there is provided a method for the separation by electrodialysis of dissolved species in a water-containing solution derived from metallurgical and chemical processing comprising the steps of forming a feed solution, said feed solution comprising a) a concentration of at least one species selected from a first group consisting of the elements of groups IA except francium, IB, IIA, IIB, IIIA except boron, IIIB, IVB, VIIB, and VIII except osmium of the periodic table of the elements; the elements vanadium, chromium, tin, lead, and bismuth; and acids of nitrogen, sulfur, fluorine, chlorine, bromine and iodine; and b) a concentration of at least one species selected from a second group consisting of acids containing an element chosen from the group consisting of boron, carbon, silicon, germanium, phosphorus, arsenic, antimony, selenium, tellurium and fluorine; said feed solution having a value of the pH, and species of said second group in said solution having a value of the oxidation state such that said at least one species of said first group is present in said solution substantially in ionized form and said at least one species of said second group is present in said solution substantially in nonionized form; feeding said feed solution to the diluate cells of an electrodialysis unit comprising a multiplicity of alternating suitable cation permselective exchange membranes and suitable anion permselective exchange membranes, said membranes defining alternating diluate and concentrate cells, an anode compartment and a cathode compartment, an anode positioned in the anode compartment and a cathode positioned in the cathode compartment; applying an electrical current between the anode and the cathode at a value sufficient to effect said separation while substantially preventing water splitting; passing flows of solutions through the diluate and the concentrate cells at a linear velocity sufficient to maintain turbulent flow in said diluate and concentrate cells; withdrawing a diluate from said diluate cells, said diluate containing substantially said concentration of said at least one species of said second group; and withdrawing a concentrate from said concentrate cells, said concentrate containing an increased concentration of said at least one species of said first group.

Preferably, the elements of said first group are present in the ionized form and are selected from the group consisting of $H^+$, $Li^+$, $Na^+$, $K^+$, $Cs^+$, $Be^{2+}$, $Mg^{2+}$, $Ca^{2+}$, $Sr^{2+}$, $Ba^{2+}$, $Ti^{4+}$, $Zr^{4+}$, $V^{5+}$, $Cr^{3+}$, $Mn^{2+}$, $Fe^{2+}$, $Fe^{3+}$, $Co^{2+}$, $Rh^{3+}$, $Ir^{4+}$, $Ni^{2+}$, $Pd^{2+}$, $Pt^{4+}$, $Cu^{2+}$, $Ag^+$, $Au^+$, $Zn^{2+}$, $Cd^{2+}$, $Hg^{2+}$, $Al^{3+}$, $Ga^{3+}$, $In^{3+}$, $Tl^+$, $Sn^{4+}$, $Pb^{2+}$, $Bi^{3+}$, $NO_3^-$, $SO_3^{2-}$, $SO_4^{2-}$, $Cl^-$, $Br^-$, $I^-$ and $F^-$.

Preferably, the species of said second group are present in the nonionized form and are selected from the group consisting of $H_3BO_3$, $H_2CO_3$, $HCO_2H$, $H_2SiO_3$, $H_2GeO_3$, $H_3PO_4$, $H_3AsO_4$, $HAsO_2$, $HSbO_2$, $H_2SeO_3$, $H_2TeO_4$ and HF.

DESCRIPTION OF THE PREFERRED EMBODIMENTS

Solutions that can be treated in the process of the invention are solutions that may be present in or are obtained from or during metallurgical and chemical processing of materials, and include metallurgical and chemical intermediate, final and waste solutions. Solutions that can be treated may be prepared from solid materials that have been solubilized into a water-containing solution. The solutions are generally water-containing solutions containing dissolved species of cations, anions or radicals of elements of the periodic table of elements. The solutions may also contain organic liquids as part of a solution, but a sufficient amount of water must be present to provide electrical conductivity and for the species to be present and remain in dissolved form. The nature of the organic compounds must be such that any fouling of the membranes is limited to a practical and economical level. Thus, to achieve separations of dissolved species in an organic solution some water must be present or added. Suitable organic liquids include water-immiscible liquids of low viscosity and water-miscible liquids. Viscous oils or greases, for example, are unsuitable because of potential membrane fouling.

The species that can be separated by the method according to the invention are divided in two groups. The first group comprises elements of the periodic table of elements that may be present in ionized form in a water-containing solution, and the second group comprises species that contain elements that may be present in nonionized form. More specifically, the first group includes the ionized form of the elements of groups IA except francium, IB, IIA, IIB, IIIA except boron, IIIB that includes the lanthanides and actinides, IVB, VIIB and VIII except osmium; the elements V, Cr, Sn, Pb and Bi; and the ionized form of acids of the elements N, S, F, Cl, Br and I. The acids included in the first groups may include, for example, $HNO_3$, $H_2SO_4$, $H_2SO_3$, HF, HCl, HBr, HI, HOCl and $HClO_3$.

The second group includes species that contain the elements B, C, Si, Ge, P, As, Sb, Se, Te and F. The species that contain the elements recited for the second group may be present in nonionized form, and the species usually include hydrogen and oxygen. Thus the species of the second group consist of acids containing an element chosen from B, C, Si, Ge, P, As, Sb, Se, Te, and F. The acids included in the second group may include, for example, $H_3BO_3$, $H_2CO_3$, $HCO_2H$, $H_2SiO_3$, $H_2GeO_3$, $H_3PO_4$, $HAsO_2$, $H_3AsO_4$, $HSbO_2$, $H_2SeO_3$, $H_2TeO_4$ and HF. These species occur in water-containing solutions in nonionized form when either the pH of the solution or the oxidation state of the element of the second group, or both, has the appropriate value. Hydrogen fluoride appears in the recitations for both groups, as HF can be present in solution in either ionized or nonionized form.

Generally, at least one member of the first group is separated from at least one member of the species of the second group. Although the separation according to the invention can be carried out for all of the elements, acids and species recited for the first and second groups, in practise, solutions usually contain a limited number of the elements and acids of the first group that are to be separated from a limited number of nonionized species of the second group.

The solution to be treated may be fed directly to an electrodialysis cell if the species to be separated are present in the desired ionized and nonionized form. In many cases, it is necessary to adjust the pH of the solution or the oxidation state of the element of the second group in the solution, and in some cases both, to ensure that the species of the first group are present in the ionized form and the species of the second group are fixed in the nonionized form.

The specific value of the pH and/or the oxidation state is dependent on the solution and the species of the first and the second groups that are present. An adjustment of the pH may be carried out by adding suitable acidic or alkaline material in an amount sufficient to attain the desired value of the pH. An adjustment of the value of the oxidation state of an element of the second group may be carried out by oxidizing or reducing the solution as required by any one of a number of suitable methods. The adjustment of the oxidation state is usually carried out by adding suitable oxidizing or reducing agent such as, for example, oxygen, ozone, hydrogen peroxide, chlorine, hydrazine, or sulfur dioxide, in an amount necessary to attain the desired value of the oxidation state. Alternatively, oxidation or reduction of solution may be accomplished electrolytically. The specifying of a solution redox potential represents a convenient guide for determining the equilibrium condition of the electrochemical reactions involved in the oxidation or reduction. Adjustment of pH and/or oxidation state are carried out such that the species of the first group remain present in solution in ionized form and remain separable from species of the second group.

For elements of the second group, the practical values of the pH and the values of the oxidation state that cause species of the second group to be present in water-containing solutions in the preferred nonionized form are given in Table I. Also given, as a guide for achieving the preferred oxidation states of the elements of the second group, are values of the redox potential based on standard conditions, as derived from thermodynamic data. Predictable deviations from these values based on, for example, temperature and chemical activity of a given system can be expected.

TABLE I

| Element | pH | Preferred Oxidation State | Pure Solution Redox Potential in mV | Preferred Species |
|---|---|---|---|---|
| B | <5 | +3 | 200 to 1200 | $H_3BO_3$ |
| C | <6 | +4 | 400 to 1000 | $H_2CO_3$ |
| C | <4 | +2 | <−400 | $HCO_2H$ |
| Si | <9 | +4 | >−200 | $H_2SiO_3$ |
| Ge | <7 | +4 | >−100 | $H_2GeO_3$ |
| P | <1.8 | +5 | >−150 | $H_3PO_4$ |
| As | 0.5 to 5.5 | +3 | >200 | $HASO_2$ |
| As | 0.5 to 3.5 | +5 | >200 | $H_3AsO_4$ |
| Sb | 1 to 10 | +3 | −100 to 400 | $HSbO_2$ |
| Se | 0.5 to 2 | +4 | 800 to 900 | $H_2SeO_3$ |
| Te | <6 | +6 | >1200 | $H_2TeO_4$ |
| F | <2 | −1 | 100 to 1100 | HF |

It is further understood that the pH and redox potential values in Table I are the maximum values or broadest ranges for preferred species of the elements of the second group, and that in many cases lower values or narrower ranges must be used to ensure that species of the first group remain present in ionized form. Again, the redox potentials are given as a guide for solutions in which the species of the second group are predominant. Deviations from the given values can be expected for more complex solutions. Nevertheless, the conversion to the preferred oxidation state can usually be achieved by standard methods.

To recapitulate, with or without adjusting either pH or oxidation state or both, the species of the first group are present in the ionized form and are selected from at least one ion of the group consisting of $H^+$, $Li^+$, $Na^+$, $K^+$, $Cs^+$, $Be^{2+}$, $Mg^{2+}$, $Ca^{2+}$, $Sr^{2+}$, $Ba^{2+}$, $Ti^{4+}$, $Zr^{4+}$, $V^{5+}$, $Cr^{3+}$, $Mn^{2+}$, $Fe^{2+}$, $Fe^{3+}$, $Co^{2+}$, $Rh^{3+}$, $Ir^{4+}$, $Ni^{2+}$, $Pd^{2+}$, $Pt^{4+}$, $Cu^{2+}$, $Ag^+$, $Au^+$, $Zn^{2+}$, $Cd^{2+}$, $Hg^{2+}$, $Al^{3+}$, $Ga^{3+}$, $In^{3+}$, $Tl^+$, $Sn^{4+}$, $Pb^{2+}$, $Bi^{3+}$, $NO_3^-$, $SO_3^{2-}$, $SO_4^{2-}$, $Cl^-$, $Br^-$, $I^-$ and $F^-$, and the species of the second group are present in the nonionized form and are at least one species selected from the group consisting of $H_3BO_3$, $H_2CO_3$, $HCO_2H$, $H_2SiO_3$, $H_2GeO_3$, $H_3PO_4$, $H_3AsO_4$, $HAsO_2$, $HSbO_2$, $H_2SeO_3$, $H_2TeO_4$ and HF.

Any solids content in the feed solution is reduced prior to electrodialysis to less than 5 ppm, preferably less than 1 ppm, by any one of a number of suitable means. The feed solution is fed to an electrodialysis unit. The electrodialysis unit comprises a multiplicity of vertically arranged, alternating cation permselective exchange membranes and anion permselective exchange membranes, a cathode compartment and an anode compartment. The cation and anion permselective exchange membranes are membranes that have a high permselectivity for the ionized species of the first group and have a low permselectivity for the nonionized species. Suitable cation permselective membranes are, for example, strongly acidic membranes which have a membrane matrix of a styrene di-vinyl benzene copolymer on a polyvinyl chloride base and possess sulphonic acid radicals ($R—SO_3H$) as active groups. The active groups comprise 3-5 milli-equivalents per gram of dry resin which is satisfactory to provide the desired selectivity for cations. In particular, we have found that suitable cationic permselective membranes are Selemion TM-type membranes such as Selemion TM CMR, Selemion TM CMV, Selemion TM CSV and Selemion TM CSR.

Suitable anion permselective membranes are, for example, basic membranes with tertiary amine or quaternary ammonium active groups, such as, for example, derived from trimethylamine (for example, $R—N(CH_2)_3.Cl$), at 3-5 milli-equivalents per gram of dry resin, and having a matrix of a styrene di-vinyl benzene copolymer on a polyvinyl chloride base. Other suitable anion permselective membranes are certain aliphatic anion membranes which have a lower electrical resistance. Selemion TM ASV, Selemion TM ASR, Selemion TM AMV and Selemion AAV are particularly suitable. The Selemion TM membranes, which are manufactured by the Asahi Glass Company of Tokyo, Japan, have the desired properties. It is understood that membranes with similar properties produced by other manufacturers, such as Neosepta TM membranes produced by the Tokuyama Soda Co. Ltd. of Japan, and Ionac TM membranes produced by the Ionac Chemical Company, are similarly suitable, and that the use of combinations of other membranes may yield the desired results.

The alternating cationic and anionic membranes form a number of alternating diluate cells and concentrate cells that are situated between the anode compartment and the cathode compartment. The anode and the cathode in the respective compartments are made of suitable materials, i.e., those that are compatible with the generation of oxygen at the anode and the evolution of hydrogen at the cathode. For example, the anode can be made of platinum or platinum-coated titanium and the cathode of stainless steel. The cathode can also be advantageously made of a material with a low hydrogen overvoltage such as platinum-coated titanium, to favour hydrogen evolution over the deposition of material on the cathode. A source of direct current is connected to the electrodes.

The feed solution is fed to the diluate cells, and diluate is withdrawn from the diluate cells. A concentrate, i.e. a solution concentrated in ionized species of the first group, is withdrawn from the concentrate cells, preferably at a rate equal to the rate of the net water transfer from the diluate to the concentrate during the electrodialysis. It is important to maintain turbulent conditions in the concentrate and diluate cells. This can be achieved by passing solution through the cells at a sufficient rate, such as achieved by recycling a portion of the diluate and a portion of the concentrate to the diluate and concentrate cells, respectively.

During electrodialysis, water transport occurs by osmosis and electro-osmosis, usually in opposing directions and at different rates. The net water transport generally occurs in the direction from the diluate to the concentrate cells. This water transport is sufficient, in most cases, to form concentrate stream flows adequate for withdrawal. In those cases wherein the net water transfer rate to the concentrate cells is less than the desired withdrawal rate of concentrate from the concentrate cells, it will be necessary to feed a receiving solution to the concentrate cells. For example, the receiving solution may be chosen from water, dilute acid and a dilute salt solution compatible with the solution being treated and the general operation of the electrodialysis.

In the cathode and anode compartments the predominant reactions are hydrogen and oxygen evolution, respectively. However, small amounts of material may deposit on the anode and cathode, respectively. Deposition on the electrodes is undesirable and should be kept at a minimum. Deposition can be controlled and kept at a minimum by a number of means such as by arranging the membranes in the electrodialysis unit such that an anionic membrane forms an end membrane, i.e., is the membrane next to the cathode compartment (a cationic membrane is then next to the anode compartment), by selecting a large enough electrode rinse flow to minimize the concentration of any contaminants, i.e. species transferred from the feed solution, by maintaining a pH of less than about four in the cathode compartment, or by using a cathode material with a low hydrogen overpotential to promote the evolution of hydrogen over metal deposition. For example, a cathode material of platinum-coated titanium may be advantageously employed. Any one of the above described means may be used alone or in combination with one or more of the other means to control deposition at the electrodes.

The cathode and the anode compartments are rinsed with circulating rinse solutions. If less control of conditions is permissible, a common rinse solution may be circulated to both the electrode compartments. The rinse solutions may be chosen from water, dilute acid and sodium sulfate solution maintained at a pH in the range of about 0 to 4. The solutions are preferably solutions of sodium sulfate. Suitable rinse solutions contain sodium sulfate in a concentration in the range of about 0.1 to 1.0M, and are maintained at a pH at values in the range of about 0.5 to 4.0. Values in the higher end of the pH range are preferred for rinsing the anode. The rinse solutions are circulated through the electrode compartments at rates sufficient to give a differential pressure across the membranes of less than about 150 kPa, preferably less than about 50 kPa. The rates are generally in the range of about 25 to 90 L/h.m$^2$, and preferably in the range of about 40 to 80 L/h.m$^2$. Rates in these ranges ensure low concentrations of contaminants that may deposit or yield undesirable compounds such as, for example, arsine when arsenic is present in the solution. A portion of the rinse solutions may be removed from circulation and be replaced with a substantially equal portion of fresh solution. The concentration of contaminants in the rinse solutions is preferably maintained at about 50 mg/L or less.

During electrodialysis, the ionized species in the feed solution pass from the diluate cells to the concentrate cells through the cationic and anionic permselective membranes respectively, leaving substantially all non-ionized species in the diluate cells. The gases evolved at the electrodes are carried from the cathode and anode compartments in the rinse solutions.

The electrodialysis unit may be operated with solution temperatures in the range of from just above the freezing temperature of the solution to as high as 60° C., i.e. from about 0° to 60° C. At the higher temperatures, the process is more efficient but the life of the membranes is reduced. The process is preferably operated with solution temperatures in the range of about 20° to 50° C.

Feed rates to the electrodialysis unit may be selected in the range of about 2 to 40 L/h.m$^2$ per membrane pair, the selected value being dependent on the concentrations of species in the feed solution and the value of the current density. The flow rate of solutions through the concentrate and diluate cells should provide turbulent flow. The flow rates through the concentrate and diluate cells and the anode and cathode compartments should be substantially balanced in order to maintain a differential pressure across the membranes not exceeding about 150 kPa, preferably, less than 50 kPa.

The current applied to the electrodes is controlled such that the membrane current density (applied current per membrane surface area) is sufficient to effect the desired separation of species but minimizes water splitting. The current is equivalent to a current density in the range of about 10 to 500 A/m$^2$, the particular value selected being a function of the concentrations of species in the feed solution. Below about 10 A/m$^2$, the ionic transfer rate is too low and above about 500 A/m$^2$ there may not be enough ionized species to replenish the ions transferred from the diffusion layer at the membrane and, as a result, water splitting and/or loss of permselectivity would occur to an undersirable extent. Water splitting and permselectivity loss can be substantially obviated when operating with current densities in the preferred range of about 50 to 350 A/m$^2$ under conditions of turbulence in the concentrate and diluate cells.

The electrodialysis may be carried out in one or in more than one stage. Although one-stage electrodialysis may be effective to reduce concentrations of ionized species in the diluate to the desired low concentrations, it may be desirable to have more than one stage. In more than one stage, the stages are preferably connected in series, diluate withdrawn from one stage being fed to the diluate cells of a subsequent stage whereby concentrations of ionized species may be further reduced. If desired, the concentrate may be further concentrated by electrodialysis, by feeding the concentrate withdrawn from concentrate cells from a first stage electrodialysis to the diluate cells of a subsequent stage. Such a step may be advantageous to effect further separation. Diluate from such a subsequent stage of electrodialysis of concentrate may be returned as feed to the first stage electrodialysis. The concentrate and diluate recovered from the process may be subjected to further treatment. Further treatment may be effected by electrodialysis or other known treatment methods for the recovery and separation of values, especially when the concentrate and diluate contain multiple species.

If needed, the membranes may be cleaned periodically and mechanically to remove any solid deposits. The membranes may also be cleaned chemically with a suitable acid solution followed by adequate rinsing with water. The electrodes may be cleaned with dilute sulfuric acid.

The invention will now be illustrated by means of the following non-limitative examples.

EXAMPLE 1

Various simulated metallurgical process solutions were treated using the method of the invention in a seven compartment electrodialyzer having alternating Selemion TM CMV cationic and Selemion TM AMV anionic membranes. The end compartments were the anode and cathode compartments separated from their respective neighbouring compartment by an anionic and a cationic membrane, respectively. A platinum anode and a stainless steel cathode were used.

The diluate cells were initially filled with the feed solution and the concentrate cells with dilute sulfuric acid (pH 2). A rinse solution containing 15 g/L $Na_2SO_4$ adjusted to pH 2 with sulfuric acid was circulated through both electrode compartments. Direct current was applied between the electrodes and the electrode current density was allowed to decrease towards the end of each test as the ionized species were being depleted in the diluate cells. Oxygen and hydrogen evolved at the anode and cathode, respectively, and some metal deposition occurred on the cathode.

In the first test, a synthetic smelt-gas scrubber solution containing arsenic and cadmium was treated after the pH was adjusted to 1.7 with the addition of 5.5 g/L $H_2SO_4$. In the second test, a zinc and arsenic-containing solution with a pH of 4.7 was treated; no pH adjustment was necessary. In the third test, a copper, nickel and arsenic-containing feed solution was treated after pH adjustment to pH 0.8 by addition of 20 g/L $H_2SO_4$. In all three tests, arsenic was present as AS(III), which is suitable for separation by the process. The redox potential in the three cases ranged from 270 mV to 350 mV as measured with a Pt(Ag/AgCl) probe. The test results are given in Table II.

TABLE II

| Test No. | Time in h | Current Density in A/m² | Concentration of Species in Diluate in g/L | | | | |
|---|---|---|---|---|---|---|---|
| | | | As | Cd | Zn | Cu | Ni |
| 1 | 0 | 50 | 11.5 | 5.0 | — | — | — |
| | 3 | — | 10.5 | 0.88 | — | — | — |
| | 4 | — | 10.7 | 0.22 | — | — | — |
| | 5 | 10 | 10.5 | 0.05 | — | — | — |
| 2 | 0 | 25 | 4.5 | — | 5.1 | — | — |
| | 4 | — | 4.5 | — | 1.7 | — | — |
| | 5 | 10 | 4.45 | — | 1.0 | — | — |
| 3 | 0 | 150 | 11.0 | — | — | 5.10 | 0.94 |
| | 5 | 60 | 10.0 | — | — | 0.74 | 0.14 |

These tests show that ionized species are effectively separated from a nonionized species by electrodialysis at an appropriate pH of the feed solution.

The following examples illustrate tests wherein metallurgical process solutions were treated in an electrodialyzer having 11 diluate and 10 concentrate cells separated by anionic membranes from the electrode compartments, and using electrodes made of platinum-coated titanium. Cationic Selemion TM CMV and anionic Selemion TM AMV membranes were used. After completion of the tests the separation factors $S_{A/B}$ were calculated, wherein A represents an ionized species and B a nonionized species. Separation factors are defined as $$S_{A/B} = \frac{A \text{ (conc.)}}{A \text{ (dil.)}} \times \frac{B \text{ (dil.)}}{B \text{ (conc.)}}$$

wherein A(conc.), A(dil.), B(dil.) and B(conc.) represent the concentrations of A and B in the concentrate and the diluate.

EXAMPLE 2

A synthetic scrubber purge solution from a lead smelter, containing Cd, Cl and F ions, $H_2SO_4$ and As (in the trivalent state), was fed into a diluate stream recirculating through the diluate cells. A concentrate stream, initially dilute $H_2SO_4$ (pH 2), was circulated through the concentrate cells. The electrode compartments were rinsed with a circulating rinse solution containing 15 g/L $Na_2SO_4$ maintained at pH 2 with addition of $H_2SO_4$ as required. To ensure turbulent conditions in the diluate and concentrate cells, the linear velocity of solutions through the cells was maintained at 5 cm/sec. The rinse solution was circulated at a rate such that the differential pressure between diluate and rinse streams was less than 20 kPa.

The feed solution had a pH of 1.8, requiring no adjustment, and was fed at 7 L/h.m² (membrane pair area). Rinse solution was fed at 44 L/h.m² (electrode area). Electrodialysis was carried out for 7 hours at 32° C. and a constant current density of 135 A/m². The concentrations of species in feed, diluate and concentrate at the end of the test are given in Table III.

TABLE III

| Species | Concentration in g/L | | |
|---|---|---|---|
| | Feed | Diluate | Concentrate |
| As | 11.5 | 11.3 | 1.1 |
| Cd | 4.0 | 0.1 | 21.0 |
| Cl | 1.2 | 0.07 | 6.1 |
| F | 1.4 | 0.9 | 1.8 |
| $H_2SO_4$ | 5.0 | 0.5 | 28.5 |

The separation factors were calculated: $S_{Cd/As}=2157$, $S_{Cl/As}=895$ and $S_{H_2SO_4/As}=586$.

The results show that Cd, Cl and $H_2SO_4$ are efficiently removed from arsenic as the nonionized species but the removal of F was only 35%. Fluoride removal can be increased by neutralizing diluate to pH 3.5 to 5.0 to dissociate HF more completely, and feeding neutralized solution to a second stage of electrodialysis. As a result of the membrane arrangement and the high rinse solution flow rate, metal deposition on the cathode was negligible.

EXAMPLE 3

Using the same method, rinse solution, rates and velocity as in Example 2, a feed solution, such as may be encountered in metallurgical processing to produce copper, and containing Ni and Cu ions, $H_2SO_4$ and As as As(III) was electrodialyzed at 37° C. for 7 hours at a constant current density of 190 A/m.$^2$. The feed solution had a pH of 1.6 and a redox potential of 330 mV (Pt-Ag/AgCl). The results are given in Table IV.

TABLE IV

| Species | Concentration in g/L | | |
|---|---|---|---|
| | Feed | Diluate | Concentrate |
| As | 3.8 | 3.3 | 2.1 |
| Cu | 4.4 | 0.12 | 33.0 |
| Ni | 1.0 | 0.04 | 6.2 |
| $H_2SO_4$ | 4.0 | 0.3 | 34.0 |
| pH | 1.6 | 2.3 | 0.6 |

The results show that Cu, Ni and $H_2SO_4$ were efficiently separated from arsenic. Metal deposition on the cathode was negligible. The separation factors were calculated:

$S_{Cu/As}=432$, $S_{Ni/As}=244$ and $S_{H_2SO_4/As}=178$.

EXAMPLE 4

In the production of zinc, the leaching of antimony containing feed stocks results in the solubilization of Sb in the Zn electrolyte (small amounts of antimony may also be added to Zn electrolyte, along with other additives, for efficient Zn electrowinning).

Using the same method, rinse solution, rates and velocity as in Example 2, a feed solution such as may be encountered in the production of zinc, and containing Zn, trivalent Sb and sulfuric acid was electrodialyzed for 7 hours at two different values of the pH and current densities. To maintain Zn in ionized form a pH value of less than 5.4 had to be maintained while Sb was present as the nonionized form $HSbO_2$. The results are given in Table V.

TABLE V

| Test | Current Density in A/m$_2$ | Species and pH | Concentration in g/L | | | Separation factor $S_{Zn/Sb}$ |
|---|---|---|---|---|---|---|
| | | | Feed | Diluate | Concentrate | |
| 1 | 100 | Zn | 3.8 | 0.7 | 26.0 | 13.5 |
| | | Sb | 4.2 | 2.9 | 8.0 | |
| | | pH | 1.9 | 1.6 | 1.0 | |
| 2 | 85 | Zn | 4.8 | 0.6 | 34.0 | 151 |
| | | Sb | 4.2 | 4.0 | 1.5 | |
| | | pH | 3.0 | 2.8 | 1.8 | |

The results show that Zn can be effectively separated from Sb and that the value of the pH has a marked effect on the separation, the separation factor increasing about elevenfold when the pH was increased from 1.9 to 3 (possibly reducing the presence of any $SbO^+$ ions).

EXAMPLE 5

Using the same method, rinse solution and velocity as in Example 2, a synthetic scrubber purge solution containing Cd and As mostly as As (III) was subjected to multistage electrodialysis after adjustment of the pH to a value of about 2.0. If As is present as As (III) the range of pH values is 0.5 to 5.5, 2 to 4 being preferred, and when present as As (V) the range is 0.5 to 3.5, preferably a value of 1.5.

The concentrate and diluate streams generated in the first stage electrodialysis were treated separately in a second electrodialysis. The results are given in Table VI.

TABLE VI

| Stage and feed | Feed rate L/h · m2 | Current density A/m$^2$ | Temp. °C. | Species and pH | Concentrations in g/L | | | Separation Factor $S_{Cd/As}$ |
|---|---|---|---|---|---|---|---|---|
| | | | | | Feed | Diluate | Conc. | |
| first, original feed | 7 | 130 | 32 | As | 11.5 | 11.3 | 1.0 | |
| | | | | Cd | 4.0 | 0.12 | 22.0 | |
| | | | | pH | 2.0 | 1.9 | 1.4 | 2072 |
| second, 1st stage diluate | 14 | 100 | 30 | As | 11.3 | 11.2 | 0.8 | |
| | | | | Cd | 0.12 | 0.02 | 0.9 | |
| | | | | pH | 1.9 | 1.8 | 1.3 | 630 |
| second, 1st stage concentrate | 3.5 | 150 | 31 | As | 1.0 | 0.9 | 0.3 | |
| | | | | Cd | 22.0 | 0.3 | 47.0 | |
| | | | | pH | 1.4 | 1.4 | 1.2 | 470 |

The results show that an arsenic and cadmium-containing solution can be effectively treated in two stages for the separation of these species yielding a final As-containing stream substantially free of Cd and a final Cd-containing stream substantially free of As.

EXAMPLE 6

A solution from a zinc plant containing Zn and Ge was treated for the recovery of a diluate suitable for the recovery of germanium. Using the same method, rinse solution, flow rates and velocity as in Example 2, feed solution was adjusted to pH 2 with $H_2SO_4$. A suitable pH for the separation may be chosen in the range of 1 to 5. 1.2 L of the feed solution was recirculated through the diluate cells for 100 minutes, and a concentrate stream (initially dilute $H_2SO_4$ and pH 2) was recirculated through the concentrate cells. The current density was allowed to vary from a maximum of 320 A/m$^2$ to 30 A/m$^2$ at the end of the 100 minute period. The temperature was 28° C. The results are given in Table VII.

TABLE VII

| Species | Concentration in g/L | | |
| --- | --- | --- | --- |
| | Feed | Diluate | Concentrate |
| Ge | 1.7 | 1.5 | 0.7 |
| Zn | 2.4 | 0.03 | 9.2 |

A portion of the original solution was treated with NaOH to increase the pH to a value of 9 to precipitate Ge. The precipitate contained 28% Ge and 39% Zn. When the diluate from the electrodialytic separation was similarly treated, the precipitate contained 66% Ge and 1.4% Zn. The results show that Ge was effectively separated from Zn, and a Ge concentrate was upgraded from 28 to 66% while reducing Zn contamination to 1.4%. Further upgrading can be obtained in two stages of electrodialysis with recycle of the second stage diluate to the first stage and generation of a more concentrated zinc solution.

EXAMPLE 7

This example illustrates the separation of Hg, Na and Cl from Se by treating crude calomel ($Hg_2Cl_2$) recovered from a treatment of roaster gases. The crude calomel, containing on a dry weight basis 74.3% Hg, 0.65% Se, 3.65% Pb and sodium was made into a slurry. The slurry was treated with chlorine gas until the redox potential had increased from 350mV to 1160mV (Pt vs. Ag/AgCl) and substantially all of the mercury had dissolved and leaving lead in the residue. The resulting solution contained 75 g/L Hg, 1.46 g/L Se and 10.2 g/L Na. The solution was diluted with water to give a feed solution for electrodialysis containing 37.5 g/L Hg, 0.73 g/L Se and 5.1 g/L Na. The pH of the feed solution was 1.1, and required no adjustment. Using the same method as in Example 2, electrodialysis is carried out at a current density of 320 A/$m^2$ and a feed rate of feed solution to the diluate cells of 5 L/h.$m^2$. Major portions of the Hg and Na are transferred to the concentrate streams while Se substantially remains in the diluate stream. The results of analysis of concentrate and diluate streams are shown in Table VIII.

TABLE VIII

| Species | Concentration in g/L | |
| --- | --- | --- |
| | Diluate | Concentrate |
| Hg | 7.2 | 55.6 |
| Na | 1.6 | 8.3 |
| Se | 1.3 | 0.03 |

The separation factors are calculated to be:

$S_{Hg/Se}=335$ and $S_{Na/Se}=225$

EXAMPLE 8

This example illustrates the separation of As and B from a brine containing mostly the chlorides and some sulfates of Na, K, Li, Ca and Mg. The pH of the brine was 7.3, and, to effect a separation, the pH was adjusted to 1.3 by the addition of hydrochloric acid. During electrodialysis the pH of the diluate was maintained at 2.0.

Using the same method, rinse solution, flow velocity and differential pressure as in Example 2, electrodialysis was carried out at ambient temperature, a current density of 250 A/$m^2$ and a feed rate of pH-adjusted feed solution to the diluate cells of 7 L/h.$m^2$. The electrodialysis unit was an Asahi Glass Model CS-0 unit provided with Selemion TM CMV and ASR membranes. Electrodialysis was continued for eight hours. The compositions of the feed solution final diluate and final concentrate, and the calculated separation factors are given in Table IX.

TABLE IX

| Stream | Concentration in mg/L | | | | | | | | |
| --- | --- | --- | --- | --- | --- | --- | --- | --- | --- |
| | Na | G | Li | Ca | Mg | HCl | SO4 | As | B |
| Feed | 100 | 97 | 600 | 10 | 11000 | 1400 | 2650 | 2800 | 365 |
| Diluate | 10 | 6 | 60 | 0.5 | 800 | 230 | 700 | 3200 | 435 |
| Concentrate | 610 | 590 | 3500 | 75 | 65000 | 8200 | 12300 | 770 | 140 |
| $S_{M/As}$ | 254 | 409 | 242 | 623 | 338 | 148 | 73 | | |
| $S_{M/B}$ | 190 | 305 | 181 | 466 | 252 | 110 | 55 | | |

The results show that As and B can be separated from Na, K, Li, Ca, Mg, HCl and $H_2SO_4$ by the method of the invention.

EXAMPLE 9

This example illustrates that Ge, As and F can be separated from Na, K, Mg, Zn, Fe, Ni, Co, HCl and $H_2SO_4$. The germanium and arsenic were in the oxidation states of four and three, respectively. Using the same method rinse solution, velocity and differential pressure as in Example 2, electrodialysis was carried out for eight hours at ambient temperature, a current density of 250 A/$m^2$ and a feed rate of feed solution to the diluate cells of 7 L/h.$m^2$. The pH of the diluate was maintained at 1.6 by the addition of sulfuric acid to the incoming feed. The flow rate of the diluate was 5.95 L/h.$m^2$ and that of the concentrate was 1.05 L/h.$m^2$. The compositions of the feed, diluate and concentrate streams are shown in Table X.

TABLE X

| Species | Concentrations in mg/L | | |
| --- | --- | --- | --- |
| | Feed | Diluate | Concentrate |
| Na | 1000 | 200 | 5300 |
| K | 20 | 4 | 102 |
| Mg | 800 | 200 | 3900 |
| Zn | 15000 | 4000 | 73000 |
| Fe | 1100 | 240 | 5700 |
| Ni | 595 | 160 | 2850 |
| Co | 200 | 70 | 900 |
| Cl | 6770 | 660 | 39200 |
| H2SO4 | 6800 | 2500 | 27600 |
| F | 110 | 63 | 295 |
| Ge | 460 | 520 | 120 |
| As | 1200 | 1200 | 1200 |

Some separation factors were calculated to be:

$S_{Cl/F}=12.7$, $S_{Cl/Ge}=25.7$ and $S_{Cl/As}=59.4$

It is noted that the value of the pH of 1.6 maintained in the diluate was favourable for achieving a nearly complete separation from germanium, but represented a compromise for the simultaneous separation from arsenic and fluorine. For efficient separation from arsenic alone, a pH value of between two and four is preferred, while for efficient separation from fluorine (HF) a pH value of 0.5 is preferred.

EXAMPLE 10

This example illustrates the separation of Zn, Fe, Na, Mg and $H_2SO_4$ from Si, F, As and P by treating impure wet-process phosphoric acid. Using the method described in Example 2, the phosphoric acid was fed at a rate of 7 L/h.m$^2$ to the electrodialysis cell. The apparent pH of the acid was 0.08. Electrodialysis was carried out at 500 A/m$^2$ and 37° C. The diluate and concentrate stream were analyzed. The oxidation state of the species and their concentrations in the process streams are given in Table XI.

TABLE XI

| Species | Oxidation State | Concentrations in g/L | | |
|---|---|---|---|---|
| | | Feed | Diluate | Concentrate |
| Zn | +2 | 25.2 | 9.9 | 78.5 |
| Fe | +2 | 21 | 9.9 | 55.5 |
| Na | +1 | 0.14 | 0.08 | 0.5 |
| Mg | +2 | 22 | 8 | 70 |
| $H_2SO_4$ | — | 32 | 5 | 135 |
| Si | +4 | 3.4 | 3.2 | 1.0 |
| F | −1 | 21.3 | 22.4 | 0.8 |
| As | +3 | 0.25 | 0.27 | 0.07 |
| P | +5 | 21 | 20 | 5 |

The separations achieved are reflected in the calculated separation factors shown in Table XII.

TABLE XII

| Separation factors | Species (M) | | | | |
|---|---|---|---|---|---|
| | Zn | Fe | Na | Mg | $H_2SO_4$ |
| $S_{M/Si}$ | 25 | 18 | 11 | 28 | 86 |
| $S_{M/F}$ | 220 | 160 | 100 | 245 | 760 |
| $S_{M/As}$ | 31 | 22 | 14 | 34 | 100 |
| $S_{M/P}$ | 32 | 22 | 14 | 35 | 110 |

Wet process phosphoric acid contains, in addition to the above-noted impurities, certain elements such as Mn, Y, La, U, Al, Cr, Ca that are present in parts per million. These elements can also be separated but their separation is masked by the high concentrations of the elements specified in Table XI. The appropriate separations may be effected by diluting the acid prior to electrodialysis, with subsequent concentration of the product streams or, alternatively, by multistage electrodialysis.

I claim:

1. A method for the separation by electrodialysis of dissolved species in a water-containing solution derived from metallurgical and chemical processing comprising the steps of forming a feed solution, said feed solution comprising:
   a) a concentration of at least one species selected from a first group consisting of the elements of groups IA except fracium, IB, IIA, IIB, IIIA except boron, IIIB, IVB VIIB, and VIII except osmium of the periodic table of the elements; the elements vanadium, chromium, tin, lead, and bismuth; and acids of nitrogen, sulfur, fluorine, chlorine, bromine and iodine; and
   b) a concentration of at least one species selected from a second group consisting of acids containing an element chosen from the group consisting of boron, carbon, germanium, phosphorus, arsenic, antimony, selenium, tellurium and fluorine; said feed solution having a value of the pH, and species of said second group in said solution having a value of the oxidation state such that said at least one species of said first group is present in said solution substantially in ionized form and said at least one species of said second group is present in said solution substantially in nonionized form; feeding said feed solution to the diluate cells of an electrodialysis unit comprising a multiplicity of alternating suitable cation permselective exchange membranes and suitable anion permselective exchange membranes, said membranes defining alternating diluate and concentrate cells, an anode compartment and a cathode compartment, an anode positioned in the anode compartment and a cathode positioned in the cathode compartment; applying an electrical current between the anode and the cathode providing a current density at a value sufficient to effect said separation while substantially preventing water splitting; passing a flow of diluate through said diluate cells and passing a flow of concentrate through said concentrate cells; passing said flow of diluate through said diluate cells and passing said flow of concentrate through said concentrate cells at a linear velocity sufficient to maintain turbulent flow in said diluate and concentrate cells; passing said ionized species from said diluate in said diluate cells to said concentrate in said concentrate cells through said cation exchange membranes and said anion exchange membranes; substantially leaving said nonionized species in said diluate; withdrawing a diluate from said diluate cells, said diluate containing substantially said at least one species of said second group as present in said feed solution; and withdrawing a concentrate from said concentrate cells, said concentrate containing an increased concentration of said at least one species of said first group.

2. A method as claimed in claim 1 wherein the elements of said first group are selected from the group of ions consisting of $H^+$, $Li^+$, $Na^+$, $K^+$, $Ca^{2+}$, $Fe^{2+}$, $Fe^{3+}$, $Co^{2+}$, $Ni^{2+}$, $Cu^{2+}$, $Zn^{2+}$, $Cd^{2+}$, $Hg^{2+}$, $Pb^{2+}$, $SO_4^{2-}$, $Cl^-$, $F^-$, and the species of said second group are selected from the group consisting of $H_3BO_3$, $H_2GeO_3$, $H_3AsO_4$, $HAsO_2$, $HSbO_2$, $H_2SeO_3$, $H_3PO_4$ and HF.

3. A method as claimed in claim 1, wherein the value of the oxidation state of an element of said second group in said water-containing solution is adjusted such that species of said second group are substantially present in said feed solution in nonionized form.

4. A method as claimed in claim 1, wherein said value of the pH of said water-containing solution is adjusted to a value such that species of said second group are present in said feed solution in nonionized form and species of said first group remain present in said feed solution in ionized form.

5. A method as claimed in claim 1, wherein said electrodialysis is carried out in more than one stage by feeding diluate withdrawn from said diluate cells in one stage to diluate cells of a subsequent stage whereby concentrations of ionized species are further reduced.

6. A method as claimed in claim 1, wherein said electrodialysis carried out in more than one stage by feeding concentrate withdrawn from said concentrate cells in one stage to diluate cells of a subsequent stage whereby the ionized species are further separated and concentrated.

7. A method as claimed in claim 1, wherein the elements of said first group are present in the ionized form and are selected from the group of ions consisting of $H^+$, $Li^+$, $Na^+$, $K^+$, $Cs^+$, $Be^{2+}$, $Mg^{2+}$, $Ca^{2+}$, $Sr^{2+}$, $Ba^{2+}$, $Ti^{4+}$, $Zr^{4+}$, $V^{5+}$, $Cr^{3+}$, $Mn^{2+}$, $Fe^{2+}$, $Fe^{3+}$, $Co^{2+}$, $Rh^{3+}$, $Ir^{4+}$, $Ni^{2+}$, $Pd^{2+}$, $Pt^{4+}$, $Cu^{2+}$, $Ag^+$, $Au^+$, $Zn^{2+}$, $Cd^{2+}$, $Hg^{2+}$, $Al^{3+}$, $Ga^{3+}$, $In^{3+}$, $Tl^+$, $Sn^{4+}$, $Pb^{2+}$, $Bi^{3+}$, $NO_3^-$, $SO_3^{2-}$, $SO_4^{2-}$, $Cl^-$, $Br^-$, $I^-$ and $F^-$; the species of said second group are present in the nonionized form and are selected from the group consisting of $H_3BO_3$, $H_2CO_3$, $HCO_2H$, $H_2GeO_3$, $H_3PO_4$, $H_3AsO_4$, $HAsO_2$, $HSbO_2$, $H_2SeO_3$, $H_2TeO_4$ and $HF$; the species of said second group are present in said feed solution in the nonionized form at said value of the oxidation state and at said value of the pH for B of $+3$ and $<5$, respectively;

for C of $+4$ and $<6$, respectively;
for C of $+2$ and $<4$, respectively;
for Ge of $+4$ and $<7$, respectively;
for P of $+5$ and $<1.8$, respectively;
for As of $+3$ and 0.5 to 5.5, respectively;
for As of $+5$ and 0.5 to 3.5, respectively;
for Sb of $+3$ and 1 to 10, respectively;
for Se of $+4$ and 0.5 to 2.0, respectively;
for Te of $+6$ and $<6$, respectively;
for F of $-1$ and $<2$, respectively; said current density is in the range of about 10 to 500 $A/m^2$; said flows are passed through said diluate and concentrate cells at a temperature in the range of about 0° to 60° C.; said flows are substantially balanced at flow rates such that the differential pressure across said membranes does not exceed about 150 kPa; and said feed solution is fed to said diluate cells at a rate in the range of about 2 to 40 $L/h.m^2$ per membrane pair.

8. A method as claimed in claim 7, wherein the value of the oxidation state of an element of said second group in said water-containing solution is adjusted such that species of said second group are substantially present in said feed solution in nonionized form.

9. A method as claimed in claim 7, wherein said value of the pH of said water-containing solution is adjusted to a value such that species of said second group are present in said feed solution in nonionized form and species of said first group remain present in said feed solution in ionized form.

* * * * *